3,306,826
PROCESS FOR PREPARING D-ARABITOL
Helen M. Fett, Minneapolis, Minn., and Milton H. Fischer, Harmony, Pa., assignors to The Pillsbury Company, Minneapolis, Minn., a corporation of Delaware
Filed Nov. 12, 1964, Ser. No. 410,553
7 Claims. (Cl. 195—35)

The present invention relates to a process for preparing D-arabitol and more particularly to an improved process for preparing D-arabitol from microbial fermentation broths. The invention is more particularly related to a commercially advantageous method of preparing arabitol of the dextro rotatory form from the fermentation liquor of sclerotium forming organisms such as *Sclerotium glucanicum*, Pillsbury Culture Code No. 13, n. sp. (NRRL 3006) or other members of the genus Sclerotium or of the general Corticium, Sclerotinia or Stromatinia as disclosed herein below.

According to the prior art, several techniques have been developed for preparing D-arabitol. According to one method, D-arabitol is obtained by production of D-arabinose or D-Lyxose with sodium amalgam as shown by Ruff, Berichte 32, 558. United States Patent Number 2,793,981 also discloses that D-arabitol can be produced by the microorganism *Endomycopsis chodati*. In accordance with the present invention and in distinction to the prior art, D-arabitol is produced in association with other useful products including scleroglucans of the general type consisting of main chains formed from glucose units linked beta 1-3 and having side chains comprising glucose units linked beta 1-6 to the glucose units of the main chain as is fully disclosed in the copending application entitled, Polysaccharides and Methods for Production Thereof, bearing Serial Number 319,093, filed Oct 24, 1963, and assigned to the assignee of the present application. The process for obtaining and purifying the scleroglucan per se will not be discussed in detail herein since it is fully disclosed in the above said application.

It is one object of the present invention to provide a process for preparing D-arabitol from fermentation products of sclerotium forming microorganisms including organisms such as *Sclerotium glucanicum* Pillsbury Culture Code No. 13, n. sp. (NRRL 3006), or other members of the genus Sclerotium or of the genera Corticium, Sclerotinia or Stromatinia.

Another object of the invention is the provision of an improved process for producing D-arabitol from microbial fermentation broths containing additional useful products including scleroglucans.

Yet another object of the invention is the provision of an improved process for obtaining D-arabitol from microbial fermentation broths in a substantially pure condition.

Still another object to the invention is the provision of an improved process readily adapted to commercial production for preparing D-arabitol from the fermentation liquors of scleroglucan forming microorganisms.

Other more detailed specific objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed wherein.

Figure 1:
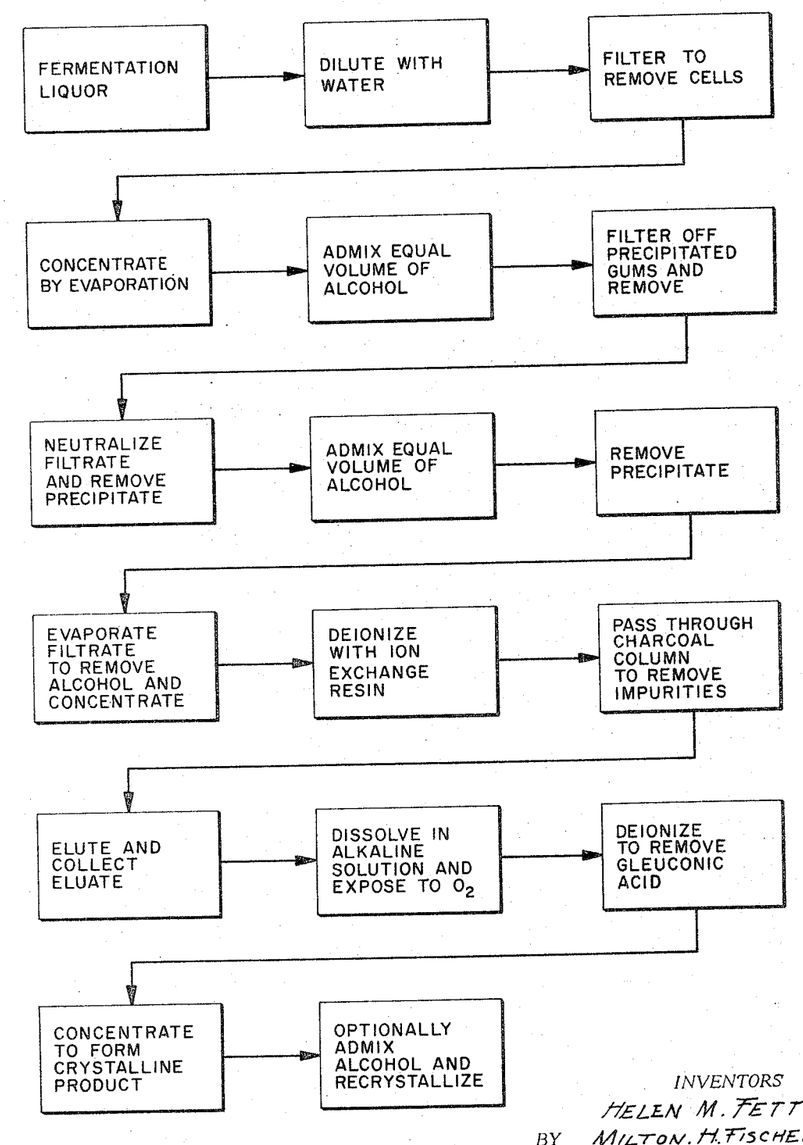
The figure is a flow chart illustrating a preferred series of steps performed in accordance with one form of the invention.

In accordance with the objects of our invention we have now discovered that a sclerotium forming microorganism such as *Sclerotium glucanicum*, Pillsbury Culture Cod No. 113, n. sp. (NRRL 3006) can be advantageously employed for producing D-arabitol. The microorganism is first innoculated with an aqueous solution containing a carbohydrate nutritive material which can include, for example, sucrose, d-xylose, d-mannose, d-glucose, d-galactose, L-arabinose, fructose, maltose, melezitose, raffinose, maltoside, aeseculin, cellobiose, trehalose, L-rhamnose, glycerol, cellulose, xylan and glycerol. Fermentation is allowed to proceed until a viscous solution is produced; a period of usually about five to ten days. The cells are then removed by filtration, and the above-mentioned scleroglucan gum is removed by the addition of a precipitating agent, as for example, a detergent or a suitable water miscible organic solvent such as alcohol followed by filtration or centrifugation. The filtrate is then neutralized and any additional precipitate is removed. At this stage, other materials can be removed by the addition of one or more precipitating agents such as alcohol followed by evaporation. Following the removal of a precipitate formed in this manner, the solution is preferably deionized by passage through an ion exchange resin. The solution is then placed on a finely divided adsorbing medium such as charcoal which preferably serves both for fractionation and also as a means for removing trace amounts of impurities. The adsorbing medium is then eluted and the eluate is collected. Glucose present in the eluate is removed, for example, by making the eluate alkaline with sodium hydroxide and oxidizing with gaseous oxygen which converts glucose in the solution to the sodium salt of gluconic acid. The resulting sodium gluconate is removed from the solution in any convenient manner as by passage through a deionizing medium, such as an ion exchange resin. The resulting deionized liquid is concentrated to form a crystalline end product consisting of substantially pure D-arabitol. If desired, the crystalline product can be purified further by recrystallization from an alcohol such as ethanol.

It has been discovered that certain molds will produce very novel and highly useful monosaccharides and polysaccharides when incubated in a medium containing carbohydrate source materials. In general, the polysaccharides produced with D-arabitol are characterized by a multiplicity of D-glucose units attached together in a straight chain through beta 1-3 linkages. They are further characterized by the presence of appended glucose units attached at various intervals to the main chain through beta 1-6 linkages. Thus, the structure can be categorized most generally as follows. As will be more fully brought out below, this structure is very unique and advantageous.

Where the letter G refers to glucopyranose and linkages of either beta 1-6 or beta 1-3 are as indicated.

Organisms which produce D-arabitol and the above class of polysaccharides include *Sclerotium glucanicum*, Pillsbury Culture Code No. 13, n.sp. (NRRL 3006); *Sclerotium delphinii* Jersveld/Welch, Pillsbury Culture Code No. 53 (source: Centraalbureau Voor Schimmelcultures, Baarn, Netherlands); *Sclerotium delphinii* Welch/White, Pillsbury Culture Code No. 46 (source: Centraalbureau); *Sclerotium rolfsii* Barnett, Pillsbury Culture Code No. 32 (source: H. Barnett, University of West Virginia, Morgantown, West Virginia); *Sclerotium rolfsii* Barnett, Pillsbury Culture Code No. 31 (source: H. Barnett, University of West Virginia, Morgantown, West Virginia); *Sclerotium rolfsii* Barnett, Pillsbury Culture Code No. 27 (source: H. Barnett, University of West Virginia, Morgantown, West Virginia); *Sclerotium rolfsii* Barnett, Pillsbury Culture Code No. 26 (source: H. Barnett, University of West Virginia, Morgantown, West Virginia); *Sclerotium rolfsii* Gilman, Pillsbury Culture Code No. 24 (source: Joseph Gilman, Iowa State University, Ames, Iowa); *Sclerotium delphinii* Gilman, Pillsbury Culture Code No. 23 (source: Joseph Gilman, Ames, Iowa); *Sclerotium delphinii* Stevens I, Pillsbury Culture Code No. 19 (source: Centraalbureau); *Sclerotium delphinii* Welch/Mix, Pillsbury Culture Code No. 9 (source: Centraalbureau); *Sclerotium delphinii* Stevens, Pillsbury Culture Code No. 8 (source: Centralbureau); *Sclerotium coffeicolumn* Stahel, Pillsbury Culture Code No. 7 (source: Centraalbureau); *Sclerotium rolfsii* OM, Pillsbury Culture Code No. 78 (source: Quartermaster Food and Container Institute, United States Army, Natick, Massachusetts); *Sclerotium rolfsii* QM, Pillsbury Culture Code No. 79 (source: Quartermaster Food and Container Institute, United States Army, Natick, Massachusetts); *Corticium rolfsii Curzi/Balducci,* Pillsbury Culture Code No. 52 (source: Centraalbureau); *Corticium rolfsii* (Sacc) Curzi, Pillsbury Culture Code No. 51 (source: Centraalbureau); *Corticium rolfsii* (Sacc) Curzi, Pillsbury Culture Code No. 50 (source: Centraalbureau); *Corticium rolfsii* Curzi/Ficus, Pillsbury Culture Code No. 57 (source: Centraalbureau); *Sclerotinia gladioli* Drayton/Massey Pillsbury Culture Code No. 45 (source: Centraalbureau); *Stromantinia narcissi* Groves, Pillsbury Culture Code No. 44 (source: Centraalbureau).

One of the important advantages of the invention resides in the ability of the organisms listed above to produce monosaccharides derivatives including D-arabitol and polysaccharides from a plurality of carbohydrate sources. For example, *Sclerotium glucanicum* n.sp. (NRRL 3006) will produce D-arabitol together with polysaccharides from carbohydrate source materials selected from the group consisting of sucrose, D-xylose, D-mannose, D-glucose (dextrose), L-arabinose, D-galactose, D-fructose, maltose, melezitose, raffinose, methylbeta-maltoside, aesculin, celloboiose, trahalose, L-rhammose, glycerol, cellulose and xylan. The other organisms listed above operate on equally wide spectra of carbohydrate sources, as will more fully be explained below. It should be noted that several utilize starch.

The degree of polymerization in the polysaccharides reported herein is an average figure for material produced in most instances at one set of conditions. Other conditions may modify these values. Moreover, in any given sample of material, molecular weight varies widely about the average, many times as much as five times greater than the average.

In the interest of brevity, the invention will be illustrated in detail primarily by reference to the D-arabitol and scleroglucan produced by the aforementioned organism *Sclerotium glucanicum* n.sp. (NRRL 3006). The details of production utilizing the other above-listed organisms, the properties of the materials produced thereby, the preparation of chemical derivatives will be in most instances similar. Specific details concerning the other organisms and the products produced therefrom will be set forth in tabular form after the detailed description.

Fermentation will now be described by way of example in connection with the organism *Sclerotium glucanicum*. To begin fermentation, a carbohydrate from the group mentioned above is placed in an aqueous solution together with the organism *Sclerotium glucanicum* and incubated at appropriate temperatures until the desired level of polysaccharide production is attained. Although the enzyme system associated with *Sclerotium glucanicum* cells is capable of producing the monosaccharides and polysaccharide in limited amounts, it is preferred that the culture medium contain nutrients for growth of the organism. Thus, it has been found that production yield is substantially increased by the presence of yeast extract or other suitable organic nitrogenous material. Of course, conventional mineral salts, such as the mineral salts contained in Czapek Dox Broth, are also desirably present to maximize the yield of the polysaccharide.

Production of D-arabitol and scleroglucan starts immediately upon inoculation of a culture medium and proceeds at a varying rate until the carbohydrate source is exhausted. Thereafter, if the organism is left in contact with the polysaccharide the organism begins to utilize the polysaccharide as a growth material. Under optimum conditions, the maximum yield will be obtained within 2 to 6 days.

Although not critical, the initial pH of the culture medium has an effect upon both the rate of production and the amount of D-arabitol produced. Although yield is not independent of initial pH the production of D-arabitol and polysaccharide will occur throughout the initial pH range of 2 to 9, the yield is optimum within the initial pH range of 3.5 to 5.5.

The initial concentration of carbohydrate source in the culture medium is similarly not critical. The optimum initial concentration range is approximately 3 to 15 percent by weight.

Also, the inoculum concentration in the initial culture medium is not critical. It is obvious, of course, that higher initial levels of inoculum concentration will provide a greater yield in less time than will lower levels of initial concentration. In general, initial inoculum concentrations up to 10 percent by weight are suitable.

D-arabitol production will occur within the temperature range of approximately 20 to approximately 37° C. Within this range, the range of 25 to 30° C. is preferred for optimum yield.

The organism *Sclerotium glucanicum* is aerobic as might be expected. Thus, aeration is essential to provide maximum rates of growth of the organism and of monosaccharide production. However, at high inoculum concentrations where the enzyme system associate with the organism is present at relatively high concentrations, monosaccharide production can proceed in the absence of oxygen.

The liquor resulting from several days fermentation under favorable growth conditions contains approximately 600 to 900 milligrams of polysaccharide per 100 millimeters culture medium and is quite viscous. As a first step in recovery of a pure product, the mycelium is separated from the water-soluble constituents of the fermentation liquor by any convenient technique. One such technique comprises diluting the fermentation liquor with an amount of water sufficient to produce a less viscous solution suitable for being filtered or centrifuged (e.g., from 1 to 3 parts fermentation liquor to 1 part water). After the resulting solution is filtered or centrifuged, the mycelium-free liquor which is obtained contains the water-soluble D-arabitol, polysaccharides and other water-soluble constituents of the culture medium.

The polysaccharide is separated from the other water-soluble ingredients by precipitating the polysaccharide with any one of a number of water-miscible organic solvents, such as methyl, ethyl or propyl alcohols, or acetone. After precipitation, the polysaccharide is separated from the liquid by any convenient technique such as filtration, centrifugation, or decantation.

If desired, the polysaccharide can be further purified by washing with any of the above-mentioned organic solvents or by redispersing the polysaccharide in water and reprecipitating in the same manner as described above. After the material is purified to the degree desired, it is then dried in any convenient manner. Suitable techniques include simple air drying, acetone drying, spray drying or drum drying. The above separation and purification procedure may be conducted at any convenient conditions of temperature and pressure. Reference will now be made to additional microbial systems in accordance with the invention.

SCLEROTIUM COFFEICOLUM STAHEL

[Pillsbury Culture Code: No. 7, American Type Culture Collection No. 15208. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 1.9 | +3 | 1.78 |
| Sucrose | 4.5 | 2.6 | +3 | 0.46 |
| Fructose | 4.5 | 1.9 | +3 | 2.08 |
| Maltose | 4.5 | 2.1 | +3 | 1.55 |
| Starch | 4.5 | 2.1 | +2 | 0.49 |
| Arabinose | 4.5 | 3.0 | +2 | 0.01 |
| Galactose | 4.5 | 2.5 | +2 | 0.20 |
| Glycerol | 4.5 | 3.2 | +1 | Floc. |
| Lactose | 4.5 | 2.5 | +3 | 1.22 |
| Mannose | 4.5 | 2.0 | +3 | 2.06 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ 0° (1 N NaOH)
Products from polymer acid hydrolysis: Glucose
Mole percent formic acid derived from periodate oxidation: 24
Hydrolysis product of periodate oxidized gum: Glycerol
Degree of polymerization: 600–800 glucopyranose units
Enzymatic hydrolysis products by $\beta$1–3 glucanase: 2:1 moles glucose gentiobiose

SCLEROTIUM DELPHINII STEVENS

[Pillsbury Culture Code: No. 8, American Type Culture Collection No. 15196. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Detrose | 4.5 | 2.7 | +3 | 1.47 |
| Sucrose | 4.5 | 2.4 | +3 | 0.66 |
| Fructose | 4.5 | 2.7 | +3 | 1.62 |
| Maltose | 4.5 | 2.8 | +3 | 0.29 |
| Starch | 4.5 | 2.6 | +3 | 0.45 |
| Arabinose | 4.5 | 2.8 | +3 | 0.08 |
| Mannose | 4.5 | 2.7 | +3 | 1.30 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +1.7° (1 N NaOH)
Products from polymer acid hydrolysis: Glucose
Mole percent formic acid derived from periodate oxidation: 23
Hydrolysis product of periodate oxidized gum: Glycerol
Degree of polymerization: 480 glucopyranose units
Enzymatic hydrolysis products by $\beta$1–3 glucanase: 2:1 moles glucose gentiobiose

SCLEROTIUM DELPHINII WELCH/MIX

[Pillsbury Culture Code: No. 9, American Type Culture Collection No. 15199. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 2.4 | +3 | 1.66 |
| Sucrose | 4.5 | 2.3 | +3 | 1.04 |
| Fructose | 4.5 | 2.2 | +3 | 1.15 |
| Maltose | 4.5 | 2.5 | +3 | 1.02 |
| Starch | 4.5 | 2.4 | +1 | 0.68 |
| Arabinose | 4.5 | 2.5 | +3 | 0.52 |
| Galactose | 4.5 | 2.7 | +1 | Floc. |
| Glycerol | 4.5 | 2.5 | +1 | Floc. |
| Lactose | 4.5 | 2.5 | +1 | 0.48 |
| Mannose | 4.5 | 2.7 | +3 | 3.57 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +6.6° (1 N NaOH)
Products from polymer acid hydrolysis: Glucose
Mole percent formic acid derived from periodate oxidation: 28.5
Hydrolysis product of periodate oxidized gum: Glycerol
Degree of polymerization: 730 glucopyranose units
Enzymatic hydrolysis products by $\beta$1–3 glucanase: 3:2 moles glucose gentiobiose

SCHLEROTIUM DELPHINII STEVENS I

[Pillsbury Culture Code: No. 19, American Type Culture Collection No. 15194. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.0 | +3 | 1.34 |
| Sucrose | 4.5 | 3.4 | +3 | 1.26 |
| Fructose | 4.5 | 3.5 | +3 | 0.66 |
| Maltose | 4.5 | 3.6 | +3 | 0.39 |
| Starch | 4.5 | 3.0 | +3 | 0.26 |
| Arabinose | 4.5 | 3.4 | +2 | 0.10 |
| Galactose | 4.5 | 3.7 | +3 | Floc. |
| Lactose | 4.5 | 3.0 | +1 | 0.04 |
| Mannose | 4.5 | 3.4 | +3 | 1.71 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +2.3° (1 N NaOH)
Products from polymer acid hydrolysis: Glucose
Mole percent formic acid derived from periodate oxidation: 21
Hydrolysis product of periodate oxidized gum: Glycerol
Degree of polymerization: 200 glucopyranose units
Enzymatic hydrolysis products by $\beta$1–3 glucanase: 3:2 moles glucose gentiobiose

SCLEROTIUM DELPHINII GILMAN

[Pillsbury Culture Code: No. 23, American Type Culture Collection No. 15197. Source: Dr. Joseph Gilman, Iowa State University, Ames, Iowa]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.5 | +3 | 5.42 |
| Sucrose | 4.5 | 3.6 | +3 | 4.52 |
| Fructose | 4.5 | 2.9 | +3 | 5.02 |
| Maltose | 4.5 | 3.1 | +3 | 4.42 |
| Starch | 4.5 | 2.5 | +3 | 3.24 |
| Arabinose | 4.5 | 2.6 | +2 | 0.90 |
| Galactose | 4.5 | 2.5 | +2 | 1.42 |
| Glycerol | 4.5 | 3.0 | +1 | Floc. |
| Lactose | 4.5 | 2.6 | +2 | 1.59 |
| Mannose | 4.5 | 3.5 | +3 | 5.07 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +1.9° (1 N NaOH)
Products from polymer acid hydrolysis: Glucose
Mole percent formic acid derived from periodate oxidation: 25
Hydrolysis product of periodate oxidized gum: Glycerol
Degree of polymerization: 200 glucopyranose units
Enzymatic hydrolysis products by $\beta$1–3 glucanase: 2:1 moles glucose gentiobiose

SCLEROTIUM ROLFSII GILMAN

[Pillsbury Culture Code: No. 24, American Type Culture Collection No. 15195. Source: Dr. Joseph Gilman, Iowa State University, Ames, Iowa]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 2.6 | +3 | 4.80 |
| Sucrose | 4.5 | 2.5 | +3 | 3.87 |
| Fructose | 4.5 | 2.3 | +3 | 5.04 |
| Maltose | 4.5 | 2.5 | +3 | 4.50 |
| Starch | 4.5 | 2.3 | +3 | 2.43 |
| Arabinose | 4.5 | 2.7 | +1 | 0.54 |
| Galactose | 4.5 | 2.3 | +1 | 0.56 |
| Glycerol | 4.5 | 2.9 | +1 | 0.08 |
| Lactose | 4.5 | 2.6 | +1 | 0.44 |
| Mannose | 4.5 | 2.3 | +3 | 3.40 |

*Other medium ingredients: 0.1% bbl. yeast extract; 0.15% MgSO$_4$; 0.1% KH$_2$PO$_4$; 0.2% NaNO$_3$; 28° C., 200 r.p.m., 2% inoculum from 1.5% dextrose broth.

CHEMICAL AND PHYSICAL RESULTS

Specific rotation: $[\alpha]_D$ +2.5° (1 N NaOH)
Products from polymer acid hydrolysis: Glucose
Mole percent formic acid derived from periodate oxidation: 27.5
Hydrolysis product of periodate oxidized gum: Glycerol
Degree of polymerization: 180–340 glucopyranose units
Enzymatic hydrolysis products by β1-3 glucanase: 2:1 moles glucose gentiobiose

SCLEROTIUM ROLFSII BARNETT

[Pillsbury Culture Code: No. 26, American Type Culture Collection No. 15205. Source Dr. H. Barnett, University of West Virginia, Morgantown, West Virginia]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.0 | +3 | 5.35 |
| Sucrose | 4.5 | 3.0 | +3 | 4.99 |
| Fructose | 4.5 | 2.9 | +3 | 4.02 |
| Maltose | 4.5 | 3.6 | +3 | 4.89 |
| Starch | 4.5 | 3.0 | +3 | 2.89 |
| Arabinose | 4.5 | 3.0 | +2 | 0.44 |
| Galactose | 4.5 | 2.5 | +2 | 0.76 |
| Glycerol | 4.5 | 3.0 | +1 | 0.20 |
| Lactose | 4.5 | 2.7 | +1 | 0.16 |
| Mannose | 4.5 | 2.8 | +3 | 4.60 |

*Other medium ingredients: 0.1% bbl. yeast extract; 0.15% MgSO$_4$; 0.1% KH$_2$PO$_4$; 0.2% NaNO$_3$; 28° C., 200 r.p.m., 2% inoculum from 1.5% dextrose broth.

CHEMICAL RESULTS

Specific rotation: $[\alpha]_D$ +3.8° (1 N NaOH)
Products from polymer acid hydrolysis: Glucose
Mole percent formic acid derived from periodate oxidation: 25.5
Hydrolysis product of periodate oxidized gum: Glycerol
Degree of polymerization: 1190 glucopyranose units
Enzymatic hydrolysis products by β1-3 glucanase: 3:2 moles glucose gentiobiose

SCLEROTIUM ROLFSII Barnett

[Pillsbury Culture Code: No. 27, American Type Culture Collection No. 15201. Source: Dr. H. Barnett, University of West Virginia, Morgantown, West Virginia]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.3 | +3 | 3.85 |
| Sucrose | 4.5 | 3.5 | +3 | 5.04 |
| Fructose | 4.5 | 3.3 | +3 | 3.65 |
| Maltose | 4.5 | 3.6 | +3 | 5.46 |
| Starch | 4.5 | 3.4 | +3 | 3.70 |
| Arabinose | 4.5 | 3.8 | +3 | 0.87 |
| Galactose | 4.5 | 3.2 | +3 | 1.06 |
| Glycerol | 4.5 | 3.0 | +1 | 0.01 |
| Lactose | 4.5 | 2.9 | +1 | 0.20 |
| Mannose | 4.5 | 3.0 | +3 | 3.34 |
| None | 4.5 | 3.6 | 0 | 0.01 |

*Other medium ingredients: 0.1% bbl. yeast extract; 0.15% MgSO$_4$; 0.1% KH$_2$PO$_4$; 0.2% NaNO$_3$; 28° C., 200 r.p.m., 2% inoculum from 1.5% dextrose broth.

CHEMICAL AND PHYSICAL RESULTS

Specific rotation: $[\alpha]_D$ 0° (1 N NaOH)
Products from polymer acid hydrolysis: Glucose
Mole percent formic acid derived from periodate oxidation: 25
Hydrolysis product of periodate oxidized gum: Glycerol
Degree of polymerization: 1480 glucopyranose units
Enzymatic hydrolysis product by β1-3 glucanase: 2:1 glucose gentiobiose

SCLEROTIUM ROLFSII Barnett

[Pillsbury Culture Code: No. 31, American Type Culture Collection No. 15206. Source: Dr. H. Barnett, University of West Virginia, Morgantown, West Virginia]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.5 | +3 | 3.55 |
| Sucrose | 4.5 | 3.4 | +3 | 4.35 |
| Fructose | 4.5 | 3.4 | +3 | 4.06 |
| Maltose | 4.5 | 3.8 | +3 | 6.20 |
| Starch | 4.5 | 3.9 | +3 | 3.31 |
| Arabinose | 4.5 | 3.9 | +3 | 0.54 |
| Galactose | 4.5 | 3.5 | +3 | 1.24 |
| Glycerol | 4.5 | 3.0 | 0 | 0.02 |
| Lactose | 4.5 | 2.9 | +1 | 0.36 |
| Mannose | 4.5 | 3.4 | +3 | 3.42 |

*Other medium ingredients: 0.1% bbl. yeast extract; 0.15% MgSO$_4$; 0.1% KH$_2$PO$_4$; 0.2% NaNO$_3$; 28° C., 200 r.p.m., 2% inoculum from 1.5% dextrose broth.

CHEMICAL AND PHYSICAL RESULTS

Specific rotation: $[\alpha]_D$ +4.4° (1 N NaOH)
Products from polymer acid hydrolysis: Glucose
Mole percent formic acid derived from periodate oxidation: 26.5
Hydrolysis product of periodate oxidized gum: Glycerol
Average degree of polymerization: 750 glucopyranose units
Enzymatic hydrolysis products by β1-3 glucanase: 2:1 mole gluco gentiobiose

SCLEROTIUM ROLFSII Barnett

[Pillsbury Culture Code: No. 32, American Type Culture Collection No. 15203. Source: Dr. H. Barnett, University of West Virginia, Morgantown, West Virginia]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.0 | +3 | 4.12 |
| Sucrose | 4.5 | 2.8 | +3 | 3.04 |
| Fructose | 4.5 | 3.0 | +3 | 3.77 |
| Maltose | 4.5 | 3.4 | +3 | 1.34 |
| Starch | 4.5 | 2.8 | +2 | 2.84 |
| Arabinose | 4.5 | 3.4 | +3 | 0.36 |
| Galactose | 4.5 | 2.8 | +3 | 1.07 |
| Glycerol | 4.5 | 2.8 | +1 | Floc. |
| Lactose | 4.5 | 2.5 | +2 | 0.64 |
| Mannose | 4.5 | 3.0 | +3 | 2.22 |

*Other medium ingredients: 0.1% bbl. yeast extract; 0.15% MgSO$_4$; 0.1% KH$_2$PO$_4$; 0.2% NaNO$_3$; 28° C., 200 r.p.m., 2% inoculum from 1.5% dextrose broth.

CHEMICAL AND PHYSICAL RESULTS

Specific rotation $[\alpha]_D$ +0.9° (1 N NaOH)
Products from polymer acid hydrolysis: Glucose
Mole percent formic acid derived from periodate oxidation: 25
Hydrolysis product of periodate oxidized gum: Glycerol
Degree of polymerization: 1160 glucopyranose units
Enzymatic hydrolysis product by β1-3 glucanase: 2:1 moles glucose gentiobose

STROMATINIA NARCISSI Groves

[Pillsbury Culture Code: No. 44, American Type Culture Collection No. 15213. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.2 | +3 | 0.92 |
| Sucrose | 4.5 | 3.3 | +3 | 2.07 |
| Fructose | 4.5 | 3.6 | +3 | 1.34 |
| Maltose | 4.5 | 3.0 | +3 | 0.70 |
| Starch | 4.5 | 4.8 | +3 | 0.10 |
| Arabinose | 4.5 | 5.1 | +3 | 1.06 |
| Galactose | 4.5 | 4.8 | +3 | 1.62 |
| Glycerol | 4.5 | 5.5 | +1 | 0.06 |
| Lactose | 4.5 | 5.6 | +3 | Floc. |
| Mannose | 4.5 | 3.5 | +3 | 1.00 |

*Other medium ingredients: 0.1% bbl. yeast extract; 0.15% MgSO₄; 0.1% KH₂PO₄; 0.2% NaNO₃; 28° C., 200 r.p.m., 2% inoculum from 1.5% dextrose broth.

CHEMICAL AND PHYSICAL RESULTS

Specific rotation: $[\alpha]_D$ —3.8° (1 N NaOH)
Products from polymer acid hydrolysis: Glucose
Mole percent formic acid derived from periodate oxidation: 29.5
Hydrolysis product of periodate oxidized gum: Glycerol
Degree of polymerization: 1570 glucopyranose units
Enzymatic hydrolysis products by β1–3 glucanase: 3:2 moles glucose gentiobiose

SCLEROTINIA GLADOLI DRAYTON/MASSEY

[Pillsbury Culture Code: No. 45, American Type Culture Collection No. 15207. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.8 | +3 | 2.12 |
| Sucrose | 4.5 | 3.6 | +3 | 2.47 |
| Fructose | 4.5 | 4.8 | +3 | 2.48 |
| Maltose | 4.5 | 3.3 | +3 | 1.50 |
| Starch | 4.5 | 4.8 | +3 | 1.31 |
| Arabinose | 4.5 | 5.0 | +3 | 1.26 |
| Galactose | 4.5 | 4.7 | +3 | 1.36 |
| Lactose | 4.5 | 5.1 | +2 | 0.82 |
| Mannose | 4.5 | 4.6 | +3 | 2.48 |

*Other medium ingredients: 0.1% bbl. yeast extract; 0.15% MgSO₄; 0.1% KH₂PO₄; 0.2% NaNO₃; 28° C., 200 r.p.m., 2% inoculum from 1.5% dextrose broth.

CHEMICAL AND PHYSICAL RESULTS

Specific rotation: $[\alpha]_D$ +2.7° (1 N NaOH)
Products from polymer acid hydrolysis: Glucose
Mole percent formic acid derived from periodate oxidation: 28
Hydrolysis product of periodate oxidized gum: Glycerol
Degree of polymerization: 940 glucopyranose units
Enzymatic hydrolysis products by β1–3 glucanase: 3:2 moles glucose gentiobiose

SCLEROTIUM DELPHINII WELCH/WHITE

[Pillsbury Culture Code: No. 46, American Type Culture Collection No. 15200. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.2 | +3 | 3.20 |
| Sucrose | 4.5 | 3.0 | +3 | 2.20 |
| Fructose | 4.5 | 3.0 | +3 | 2.64 |
| Maltose | 4.5 | 2.8 | +3 | 1.94 |
| Starch | 4.5 | 2.8 | +2 | 0.57 |
| Arabinose | 4.5 | 2.7 | +2 | 1.36 |
| Galactose | 4.5 | 2.7 | +3 | 0.63 |
| Lactose | 4.5 | 2.6 | +2 | 0.06 |
| Mannose | 4.5 | 3.1 | +3 | 2.72 |

*Other medium ingredients: 0.1% bbl. yeast extract; 0.15% MgSO₄; 0.1% KH₂PO₄; 0.2% NaNO₃; 28° C., 200 r.p.m., 2% inoculum from 1.5% dextrose broth.

CHEMICAL AND PHYSICAL RESULTS

Specific rotation: $[\alpha]_D$ —2.9° (1 N NaOH)
Products from polymer acid hydrolysis: Glucose
Mole percent formic acid derived from periodate oxidation: 28
Hydrolysis product of periodate oxidized gum: Glycerol
Degree of polymerization: 375 glucopyranose units
Enzymatic hydrolysis products by β1–3 glucanase: 2:1 moles glucose gentiobiose

CORTICIUM ROLFSH (SACC) CURZI

[Pillsbury Culture Code: No. 50, American Type Culture Collection No. 15212. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.0 | +3 | 2.02 |
| Sucrose | 4.5 | 3.4 | +3 | 2.94 |
| Fructose | 4.5 | 3.3 | +3 | 1.37 |
| Maltose | 4.5 | 3.5 | +3 | 2.06 |
| Starch | 4.5 | 3.2 | +1 | 0.12 |
| Arabinose | 4.5 | 3.8 | +2 | Floc. |
| Galactose | 4.5 | 2.9 | +1 | 0.10 |
| Glycerol | 4.5 | 2.9 | +1 | 0.06 |
| Lactose | 4.5 | 3.2 | +2 | 0.94 |
| Mannose | 4.5 | 3.5 | +3 | 2.44 |

*Other medium ingredients: 0.1% bbl. yeast extract; 0.15% MgSO₄; 0.1% KH₂PO₄; 0.2% NaNO₃; 28° C., 200 r.p.m., 2% inoculum from 1.5% dextrose broth.

CHEMICAL AND PHYSICAL RESULTS

Specific rotation: $[\alpha]_D$ +2.4° (1 N NaOH)
Products from polymer acid hydrolysis: Glucose
Mole percent formic acid derived from periodate oxidation: 26.5.
Hydrolysis product of periodate oxidized gum: Glycerol
Degree of polymerization: 1280 glucopyranose units
Enzymatic hydrolysis products by β1–3 glucanase: 2:1 moles glucose gentiobiose

CORTICIUM ROLFSII (SACC) CURZI

[Pillsbury Culture Code: No. 51, American Type Culture Collection No. 15210. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.6 | +3 | 2.52 |
| Sucrose | 4.5 | 3.5 | +3 | 2.54 |
| Fructose | 4.5 | 3.5 | +3 | 2.66 |
| Maltose | 4.5 | 3.5 | +3 | 2.34 |
| Starch | 4.5 | 3.0 | +2 | 0.70 |
| Aribinose | 4.5 | 3.7 | +3 | 0.58 |
| Galactose | 4.5 | 3.6 | +3 | 0.88 |
| Glycerol | 4.5 | 3.0 | +1 | 0.02 |
| Lactose | 4.5 | 3.1 | +3 | 1.72 |
| Mannose | 4.5 | 3.7 | +3 | 3.10 |

*Other medium ingredients: 0.1% bbl. yeast extract; 0.15% MgSO₄; 0.1% KH₂PO₄; 0.2% NaNO₃; 28° C., 200 r.p.m., 2% inoculum from 1.5% dextrose broth.

CHEMICAL AND PHYSICAL RESULTS

Specific rotation: $[\alpha]_D$ +1.4° (1 N NaOH)
Products from polymer acid hydrolysis: Glucose
Mole percent formic acid derived from periodate oxidation: 26
Hydrolysis product of periodate oxidized gum: Glycerol
Degree of polymerization: 1500 glucopyranose units
Enzymatic hydrolysis products by β1–3 glucanase: 3:2 moles glucose gentiobiose

CORTICIUM ROLFSII CRUZI/BALDUCCI

[Pillsbury Culture Code: No. 52, American Type Culture Collection No. 15211. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 2.4 | +3 | 0.91 |
| Sucrose | 4.5 | 2.2 | +3 | 0.54 |
| Fructose | 4.5 | 2.9 | +3 | 1.86 |
| Maltose | 4.5 | 2.3 | +3 | 2.02 |
| Starch | 4.5 | 2.1 | +2 | 1.06 |
| Arabinose | 4.5 | 2.5 | +2 | 0.26 |
| Galactose | 4.5 | 2.3 | +1 | 0.04 |
| Mannose | 4.5 | 2.6 | +3 | 1.46 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +1.8° (1 N NaOH)
Products from polymer acid hydrolysis: Glucose
Mole percent formic acid derived from periodate oxidation: 25.5
Hydrolysis product of periodate oxidized gum: Glycerol
Degree of polymerization: 930 glucopyranose units
Enzymatic hydrolysis products by $\beta$1-3 glucanase: 3:2 moles glucose gentibiose

SCLEROTIUM DELPHINII JERSVELD/WELCH

[Pillsbury Culture Code: No. 53, American Type Culture Collection No. 15198. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.2 | +3 | 1.25 |
| Sucrose | 4.5 | 2.3 | +3 | 3.31 |
| Fructose | 4.5 | 2.9 | +3 | Floc. |
| Maltose | 4.5 | 2.2 | +3 | 1.88 |
| Starch | 4.5 | 2.5 | +3 | 0.64 |
| Aribinose | 4.5 | 3.0 | +3 | 0.80 |
| Galactose | 4.5 | 3.0 | +3 | 0.46 |
| Lactose | 4.5 | 2.4 | +1 | 0.52 |
| Mannose | 4.5 | 3.2 | +3 | Floc. |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation $[\alpha]_D$ +1.8° (1 N NaOH)
Products from polymer acid hydrolysis: Glucose
Mole percent formic acid derived from periodate oxidation: 25.5
Hydrolysis product of periodate oxidized gum: Glycerol
Degree of polymerization: 770 glucopyranose units
Enzymatic hydrolysis products by $\beta$ 1-3 glucanase: 3:2 moles glucose gentibiose

CORTICIUM ROLFSII CURZI/FICUS

[Pillsbury Culture Code: No. 57, American Type Culture Collection No. 15209. Source: Centraalbureau Voor Schimmelcultures, Baarn, Netherlands]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.2 | +3 | 4.13 |
| Sucrose | 4.5 | 3.6 | +3 | 2.42 |
| Fructose | 4.5 | 3.6 | +3 | 1.86 |
| Maltose | 4.5 | 3.9 | +3 | 2.56 |
| Starch | 4.5 | 2.5 | +2 | 2.52 |
| Arabinose | 4.5 | 3.3 | +1 | 0.44 |
| Galactose | 4.5 | 2.8 | +2 | 0.60 Floc. |
| Glycerol | 4.5 | 3.0 | +2 | |
| Lactose | 4.5 | 2.8 | +2 | 0.70 |
| Mannose | 4.5 | 3.2 | +3 | 4.02 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +2.1° (1 N NaOH)
Products from polymer acid hydrolysis: Glucose
Mole percent formic acid derived from periodate oxidation: 25
Hydrolysis product of periodate oxidized gum: Glycerol
Degree of polymerization: 715 glucopyranose units
Enzymatic hydrolysis products by $\beta$ 1-3 glucanase: 2:1 moles glucose gentiobiose

SCLEROTIUM ROLFSII QM

[Pillsbury Culture Code: No. 78, American Type Culture Collection No. 15202. Source: Quartermaster Food and Container Institute, U.S. Army, Natick Massachusetts]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 3.8 | +3 | 2.35 |
| Sucrose | 4.5 | 3.7 | +3 | 2.44 |
| Fructose | 4.5 | 3.8 | +3 | 3.04 |
| Maltose | 4.5 | 3.7 | +3 | 2.40 |
| Starch | 4.5 | 3.2 | +3 | 1.95 |
| Arabinose | 4.5 | 3.5 | +2 | 0.24 |
| Galactose | 4.5 | 3.4 | +3 | 0.50 |
| Glycerol | 4.5 | 3.1 | +1 | Floc. |
| Lactose | 4.5 | 3.5 | +3 | 1.12 |
| Mannose | 4.5 | 3.9 | +3 | 3.60 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ −1.3° (1 N NaOH)
Products from polymer acid hydrolysis: Glucose
Mole percent formic acid derived from periodate oxidation: 26
Hydrolysis product of periodate oxidized gum: Glycerol
Degree of polymerization: 480+ glucopyranose units
Enzymatic hydrolysis products by $\beta$ 1-3 glucanase: 2:1 moles glucose gentiobiose

SCLEROTIUM ROLFSII QM

[Pillsbury Culture Code: No. 79 American Type Culture Collection No. 15204. Source: Quartermaster Food and Container Institute, U.S. Army, Natick, Massachusetts]

FERMENTATION RESULTS

| Carbohydrate (2%*) | Initial pH | Final pH | Relative Amount Growth | Yield Polymer, g./l. |
|---|---|---|---|---|
| Dextrose | 4.5 | 2.6 | +3 | 0.96 |
| Sucrose | 4.5 | 2.5 | +3 | 0.81 |
| Fructose | 4.5 | 2.7 | +3 | 2.08 |
| Maltose | 4.5 | 2.9 | +3 | 0.40 |
| Starch | 4.5 | 2.9 | +2 | 1.01 |
| Arabinose | 4.5 | 2.8 | +2 | 0.49 |
| Galactose | 4.5 | 2.4 | +2 | 0.25 |
| Glycerol | 4.5 | 2.8 | +1 | Floc. |
| Lactose | 4.5 | 2.5 | +2 | 0.37 |
| Mannose | 4.5 | 2.8 | +3 | 3.66 |

*Other medium ingredients: 0.1% bbl. yeast extract; 0.15% $MgSO_4$; 0.1% $KH_2PO_4$; 0.2% $NaNO_3$; 28° C., 200 r.p.m., 2% inoculum from 1.5% dextrose broth.

CHEMICAL AND PHYSICAL RESULTS

Specific rotation: $[\alpha]_D$ +1.9 (1 N NaOH)
Products from polymer acid hydrolysis: Glucose
Mole percent formic acid derived from periodate oxidation: 26
Hydrolysis product of periodate oxidized gum: Glycerol
Degree of polymerization: 790 glucopyranose units
Enzymatic hydrolysis products by $\beta$ 1-3 glucanase: 2:1 moles glucose gentiobiose The process steps in accordance with the preferred form of the invention following fermentation will not be set forth in detail. It will be assumed for the purpose of example that 125 liters of fermentation liquor is used as a starting material.

Because the fermentation liquor has a relatively high viscosity, it is first diluted approximately four times with water. The cells are then removed through the use of any known and commercially available apparatus for this purpose. Pressure filtration using a diatomaceous earth filter has proven satisfactory. The resulting filtrate is then concentrated to the original 125 liters. To this filtrate is added a suitable known precipitating agent of the type adapted to cause the precipitation of a polysaccharide gum. While various agents of this type are available, among the preferred precipitating agents are detergents such as trimethyl-n-hexadecylammonium chloride sold under the registered trademark Arquad 16–50 by the Armour Company, of Chicago, Illinois, and alcohols, as isopropyl alcohol. If detergents are employed, the pH should be adjusted as required.

Following the addition of the precipitating agent, the polysaccharide gum referred to in the above noted application will form as a flocculent precipitate. This precipitate is then removed in any convenient manner as by filtration or centrifugation. The resulting filtrate will be slightly acid. It is neutralized by the addition of the appropriate amount of an alkali. One suitable alkali is sodium carbonate. Upon neutralization, a small amount of precipitate will form the composition of which is unknown. This precipitate should then be removed from the solution.

Next, it is desirable to remove excess solvent by evaporation and remove any residual gums or other impurities by one or more additional treatments with a precipitating agent such as ethanol. A 3.5 liter sample of the solution can, for example, be evaporated to a volume of about 75 milliliters. To this solution can be added an equal volume of 95% ethanol. About 6 grams of insoluble matter will then precipitate. This precipitate should be removed in any convenient manner. If desired, more alcohol can be added and additional precipitate removed. The alcohol should also be removed by evaporation or other suitable means. The resulting filtrate will then be slightly acidic and is deionized by passage through a column of commercially available cation and ion exchange resins such as the resins sold under the registered trademark Duolite A–4 and Amberlite I.R. 120 and I.R 400 by the Diamond Alkali Company, of Cleveland, Ohio, and the Rohm & Haas Company, of Philadelphia, Pennsylvania, respectively.

Following neutralization, the solution is preferably passed through an adsorbant of a suitable and well-known type adapted to adsorb carbohydrates. The column can, for example, be composed of coconut charcoal. Prior to adding the liquid to the column, the column should be cleaned with a dilute acid solution and an alcohol wash as will be apparent to those skilled in the art. The column should be eluted with distilled water to remove the desired adsorbed carbohydrates. The resulting eluate will be a relatively clear and uncolored solution. As the distilled water is passed through the column during the washing operation, the bulk of the polyols containing 5 carbons or less plus monosaccharides will have been removed after 1,500 to 2,000 milliliters of distilled water has been passed through the column. After about 3,000 to 5,000 milliliters of distilled water has been passed through the column, nearly all of the polyols will ordinarily be removed from the column. The residual amount of polyols remaining on the column will depend upon the original concentration of the polyols, the size of the charcoal column, the composition of adsorbant, the temperature and other related factors. For optimum yields, water should be run through the column until the usual analytical tests indicate that polyols are absent from the eluate.

The eluate obtained as described above is collected and subjected to oxidation. The oxidation can be carried out in any of various ways known to the art. The bubbling of gaseous oxygen through the eluate following the addition of an alkali such as sodium hydroxide to form a concentration of about 3.0% sodium hydroxide by weight has proven satisfactory. The oxygen should be bubbled through the solution until all of the glucose has been converted to gluconic acid. This will usually be completed in less than three hours. The gluconic acid is then removed in any convenient and well-known manner. One convenient method is to pass the solution through an ion exchange resin such as an ion exchange resin sold under the trademark Amberlite I.R. 120 and I.R. 400 by the Rohm & Haas Company, of Philadelphia, Pennsylvania. The filtrate is then concentrated until a crystalline product is obtained. The crystalline product can be purified by recrystallization from ethanol.

It can be acetylated as by reaction with acetic anhydride in pyridine or anhydrous sodium acetate. An acid catalyst may also be used if desired. The melting point of the resulting acetylated product will be found identical to that obtained by the acetylation product of D-arabitol (78°–80° C.).

The invention will be better understood by reference to the following examples setting forth a few of the various ways in which the invention can be employed.

*Example I*

A sterile culture medium consisting of:

| | | |
|---|---|---|
| Distilled water | ml | 300 |
| Sucrose | g | 9 |
| $NaHO_3$ | g | 0.9 |
| $K_2HPO_4$ | g | 0.3 |
| $MgSO_4$ | g | 0.15 |
| Autolyzed yeast | g | 0.3 |
| $FeSO_4$ | g | 0.003 | is inoculated with a loopful of *Sclerotium glucanicum* n.sp. (NRRL 3006) and incubated for 3 days at approximately 28° C. on a rotary shaker. The resultant culture is placed in a sterile blender, homogenized and set aside for use as an inoculum.

A larger culture medium is prepared in a fermenter vessel having a capacity of 14 liters using:

| | | |
|---|---|---|
| Distilled water | liters | 10 |
| Sucrose | g | 300 |
| $NaNO_3$ | g | 30 |
| $K_2HPO_4$ | g | 10 |
| $MgSO_4$ | g | 5 |
| KCl | g | 5 |
| Autolyzed yeast | g | 10 |
| $FeSO_4$ | g | 0.5 |

The pH of the resulting medium is adjusted to 4.5 with hydrochloric acid and then autoclaved for one hour at 15 p.s.i. steam pressure (250° F.).

After the culture medium had cooled, the previously prepared, homogenized 300 ml. inoculum is added to the fermenter vessel, which vessel is placed in a laboratory fermenter equipped with variable speed agitation, a sterile air supply, and temperature control provided by a constant temperature water batch. The medium is incubated for five days in the fermenter at a temperature of 28° C., an agitation rate of 200 r.p.m., and an aeration rate of 100 cc./min. The fermentate is then removed and placed in a 30 liter vessel to which 10 liters of water were added. After thorough mixing, the diluted fermentate is heated to approximately 90° to 95° C., cooled, and then filtered through six layers of cotton gauze for removal of mold cells.

To the filtrate, six liters of methyl alcohol were added. Within a few minutes, a product rose to the surface as a floc was removed therefrom by skimming. This product collected and stored for reuse and sale.

The filtrate obtained after removal of the gum is neutralized with sodium carbonate until the pH reached 7.0. As this is done, a precipitate will form. The precipitate is then removed by centrifugation. Following centrifugation, a 3.5 liter sample of the filtrate is concentrated in a vacuum evaporator and 75 milliliters of 95% ethanol is added. About 5.9 gm. of insoluble matter can then be filtered off. The resulting filtrate is then concentrated to about 75 milliliters by evaporation. The resin is washed until the eluate gives a negative test with Fehling's solution indicating the absence of reducing materials. The eluate is concentrated by evaporation under vacuum to a syrup. The syrup is then placed on a pre-washed coconut charcoal column. Distilled water is then washed through the column until the eluate is free of D-arabitol as noted by thin layer chromotographic analysis of the eluate. To the resulting eluate is added sodium hydroxide to provide a 3.0% solution of sodium hydroxide by weight. Gaseous oxygen is bubbled through this solution for a period of three hours. The solution is then passed through an ion exchange resin consisting of Amberlite I.R. 120 and I.R. 400 manufactured by the Rohm & Haas Company, of Philadelphia, Pennsylvania, to remove gluconic acid. The resulting solution is concentrated and D-arabitol is crystallized from alcohol solution. The sample was spotted on a paper chromatograph and a thin layer chromatograph having a kieselguhr G layer applied to a substitute. The spot positions in each case were identical with a commercially available D-arabitol sample. The dried material had a melting point of 103° C. to 104° C. A mixed melting point with commercial D-arabitol showed no melting point depression.

*Example II*

The D-arabitol obtained above is reacted with an equal molar amount of acetic anhydride in dry pyridine. The resulting product is found to have a melting point identical with that of acetylated D-arabitol viz. 78 to 80° C.

*Example III*

A sterile culture medium consisting of:

| | | |
|---|---|---|
| Distilled water | ml | 300 |
| Sucrose | g | 9 |
| NaNO$_3$ | g | 0.9 |
| K$_2$HPO$_4$ | g | 0.3 |
| MgSO$_4$ | g | 0.15 |
| KCl | g | 0.15 |
| Autolyzed yeast | g | 0.3 |
| FeSO$_4$ | g | 0.003 | was inoculated with a loopful of *Corticium rolfsii* Q.M., Pillsbury Culture Code 78 (Source: Quartermaster Food and Container Institute U.S. Army Natick, Massachusetts) and incubated for 3 days at approximately 28° C. on a rotary shaker. The resultant culture is placed in a sterile blender, homogenized and set aside for use as an inoculum.

A larger culture medium is prepared in a fermenter vessel having a capacity of 14 liters using:

| | | |
|---|---|---|
| Distilled water | liters | 10 |
| Glucose | g | 300 |
| NaNO$_3$ | g | 30 |
| K$_2$HPO$_4$ | g | 10 |
| MgSO$_4$ | g | 5 |
| KCl | g | 5 |
| Autolyzed yeast | g | 10 |
| FeSO$_4$ | g | 0.5 |

The pH of the resulting medium is adjusted to 5 with hydrochloric acid and then autoclaved for one hour at 15 p.s.i. steam pressure (250° F.).

After the culture medium had cooled, the previously prepared, homogenized 300 ml. inoculum is added to the fermenter vessel, which vessel is then placed in a laboratory fermenter as described in Example I. The medium was incubated for two days in the fermenter at a temperature of 35° C., an agitation rate of 200 r.p.m., and an aeration rate of 1200 cc./min. The fermentate is then removed and placed in a 30 liter vessel to which 10 liters of water is added. After thorough mixing, the diluted fermentate was heated to approximately 90 to 95° C., cooled, and then filtered through six layers of cotton gauze for removal of mold cells.

To the filtrate, six liters of isopropyl alcohol were added. Within a few minutes, the polysaccharides will rise to the surface as a floc was removed therefrom by skimming. The filtrate is then treated as in Example I to isolate D-arabitol.

*Example IV*

To the filtrate obtained in Example III following the precipitation of the polyglucan gum is added sufficient sodium carbonate to bring the pH to about 7 and a volume of alcohol equaling the volume of the filtrate is added. The resulting precipitate is then removed. The filtrate thus obtained is passed through an adsorbant medium consisting of charcoal and eluted until monosaccharides are entirely removed. To the resulting solution is added a commercially available enzyme solution of glucose oxidase-catalase enzyme system such as Glucatase manufactured by Chas. Pfizer & Company, Inc., of New York, New York, in the amount of about 5 parts for each 100 parts of solution. The enzyme system will function to remove the glucose from the solution by converting it to gluconic acid. The acid is then removed by passing the solution through an Amberlite exchange resin of the type described in Example I. The resulting solution is then evaporated to form D-arabitol as a crystalline product.

*Example V*

A sterile culture medium consisting of:

| | | |
|---|---|---|
| Distilled water | ml | 300 |
| Sucrose | g | 9 |
| NaNO$_3$ | g | 0.9 |
| K$_2$HPO$_4$ | g | 0.3 |
| MgSO$_4$ | g | 0.15 |
| KCl | g | 0.15 |
| Autolyzed yeast | g | 0.3 |
| FeSO$_4$ | g | 0.003 | is inoculated with a loopful of *Corticium rolfsii* QM, Pillsbury Culture Code 78 (Source: Quartermaster Food and Container Institute U.S. Army Natick, Massachusetts) and incubated for 10 days at approximately 37° C. on a rotary shaker. The resultant culture is placed in a sterile blender, homogenized and set aside for use as an inoculum.

A larger culture medium is prepared in a fermenter vessel having a capacity of 40 liters using:

| | | |
|---|---|---|
| Distilled water | liters | 10 |
| Glucose | g | 300 |
| NaNO$_3$ | g | 30 |
| K$_2$HPO$_4$ | | 10 |
| MgSO$_4$ | g | 5 |
| KCl | g | 5 |
| Autolyzed yeast | g | 10 |
| FeSO$_4$ | g | 0.5 |

The pH of the resulting medium is adjusted to with hydrochloric acid and then autoclaved for one hour at 15 p.s.i. steam pressure (250° F.).

After the culture medium had cooled, the previously prepared, homogenized 200 ml. inoculum is added to the fermenter vessel, which vessel is then placed in a laboratory fermenter as described in Example I. The medium was incubated for 12 days in the fermenter at a temperature of 37° C., an agitation rate of 100 r.p.m., and an aeration rate of 50 cc./min. The fermentate is then removed and placed in a 30 liter vessel to which 10 liters of water is added. After thorough mixing, the diluted fermentate was heated to approximately 90 to 95° C., cooled, and then filtered through six layers of cotton gauze for removal of mold cells.

To the filtrate, six liters of isopropyl alcohol were added. Within a few minutes, the polysaccharides will rise to the surface as a floc and was removed therefrom by skimming. The filtrate is then treated as in Example I to isolate D-arabitol.

*Example VI*

A sterile culture medium consisting of:

| | | |
|---|---|---|
| Distilled water | ml | 300 |
| Sucrose | g | 9 |
| NaNO₃ | g | 0.9 |
| K₂HPO₄ | g | 0.3 |
| MgSO₄ | g | 0.15 |
| KCl | g | 0.15 |
| Autolyzed yeast | g | 0.3 |
| FeSO₄ | g | 0.003 | is inoculated with a loopful of *Corticium rolfsii* QM, Pillsbury Culture Code 78 (Source: Quartermaster Food and Container Institute U.S. Army Natick, Massachusetts) and incubated for 3 days at approximately 28° C. on a rotary shaker. The resultant culture is placed in a sterile blender, homogenized and set aside for use as an inoculum.

A larger culture medium is prepared in a fermenter vessel having a capacity of 10 liters using:

| | | |
|---|---|---|
| Distilled water | liters | 10 |
| Glucose | g | 300 |
| NaNO₃ | g | 30 |
| K₂HPO₄ | g | 10 |
| MgSO₄ | g | 5 |
| KCl | g | 5 |
| Autolyzed yeast | g | 10 |
| FeSO₄ | g | 0.5 |

The pH of the resulting medium is adjusted to 4.0 with hydrochloric acid and then autoclaved for one hour at 15 p.s.i. steam pressure (250° F.).

After the culture medium had cooled, the previously prepared, homogenized 50 ml. inoculum is added to the fermenter vessel, which vessel is then placed in a laboratory fermenter as described in Example I. The medium was incubated for 1.5 days in the fermenter at a temperature of 20° C., an agitation rate of 400 r.p.m., and an aeration rate of 100 cc./min. The fermentate is then removed and placed in a 30 liter vessel to which liters of water is added. After thorough mixing, the diluated fermentate was heated to approximately 90 to 95° C., cooled, and then filtered through six layers of cotton gauze for removal of mold cells.

To the filtrate, six liters of isopropyl alcohol were added. Within a few minutes, the polysaccharides will rise to the surface as a floc and was removed therefrom by skimming. The filtrate is then treated as in Example I to isolate D-arabitol.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A process for producing D-arabitol from sclarotium forming microorganisms selected from the group consisting of the genera Sclerotium, Corticium, Stromatina, and Sclerotinia comprising
    (a) innoculating an aqueous solution containing the microorganisms
    (b) allowing the solution to ferment
    (c) removing the mycillia from the solution, isolating and removing polysaccharide gum present in said solution, thereafter adding a suitable water-miscible solvent material adapted to precipitate additional carbohydrates, neutralizing the solution, removing precipitates present in the solution, isolating and removing glucose from a solution and isolating and removing D-arabitol from the solution.

2. A process for producing D-arabitol from sclarotium forming microorganisms selected from the group consisting of the genera Sclerotium, Corticium, Stromatinia and Sclerotinia comprising
    (a) innoculating an aqueous solution containing the microorganisms
    (b) allowing the solution to ferment
    (c) isolating D-arabitol from the solution 3. The process according to claim 2 wherein said isolation comprises diluting the filtrate with water, removing cells from the solution, concentrating the solution, admixing with an equal volume of isopropanol removing the precipitate formed by the admixture of isopropanol, neutralizing the solution and removing precipitates thus formed, admixing sufficient water-miscible organic solvent to precipitate additional carbohydrates precipitate present in the solution and removing the solvent, deionizing solution, passing the solution through a finely divided adsorbant, removing glucose from the solution and thereafter isolating D-arabitol from the solution.

4. The process according to claim 3 wherein the glucose is removed by oxidizing the glucose to form gluconic acid and thereafter removing the gluconic acid thus formed by passing solution through an anion exchange resin.

5. The process according to claim 3 wherein the finely divided adsorbant comprises a column of finely divided coconut charcoal.

6. In a method for producing D-arabitol, the steps comprising:
    (a) Inoculating an aqueous solution containing a carbohydrate source with at least one organism selected from the group consisting of *Sclerotium coffeicolum* Stahel (Pillsbury Culture Code No. 7, American Type Culture Collection No. 15208); *Sclerotium delphinii* Stevens (Pillsbury Culture Code No. 8, American Type Culture Collection No. 15196); *Sclerotium delphinii* Gilman (Pillsbury Culture Code No. 23, American Type Culture Collection No. 151697); *Sclerotium rolfsii* Gilman (Pillsbury Culture Code No. 24, American Type Culture Collection No. 15195); *Sclerotium rolfsii* Barnett (Pillsbury Culture Code No. 27, American Type Culture Collection No. 15201); *Sclerotium rolfsii* Barnett (Pillsbury Culture Code No. 31, American Type Culture Collection No. 15206); *Sclerotium rolfsii* Barnett (Pillsbury Culture Code No. 32, American Type Culture Collection No. 15203); *Sclerotium deliphinii* Welch/White (Pillsbury Culture Code No. 46, American Type Culture Collection No. 15200); *Corticium rolfsii* (Sacc) Curzi (Pillsbury Culture Code No. 50, American Type Culture Collection No. 15212); *Corticium rolfsii* Curzi/Ficus (Pillsbury Culture Code No. 57, American Type Culture collection No. 15209); *Sclerotium rolfsii* QM (Pillsbury Culture Code No. 78, American Type Culture Collection No. 15202); *Sclerotium rolfsii* QM (Pillsbury Culture Code No. 79, American Type Culture Collection No. 15204); *Sclerotium delphinii* Welch/Mix (Pillsbury Culture Code No. 9, American Type Culture Collection No. 15199); *Sclerotium delphinii* Stevens I (Pillsbury Culture Code No. 19, American Type Culture Collection No. 15194); *Sclerotium rolfsii* Barnett (Pillsbury Culture Code No. 26, American Type Culture Collection No. 15205); *Stromatinia narcissi* Groves (Pillsbury Culture Code No. 44, American Type Culture Collection No. 15213); *Sclerotinia gladoli* Drayton/Massey (Pillsbury Culture Code No. 45, American Type Culture Collection No. 15207); *Corticium rolfsii* Sacc) Curzi (Pillsbury Culture Code No. 51, American Type Culture Collection No. 15210); *Corticium rolfsii* Curzi/Balducci (Pillsbury Culture Code No. 52, American Type Culture Collection No. 15211); *Sclerotium delphinii* Jersveld/Welch (Pillsbury Culture Code No. 53, American Type Culture Collection No. 15198); and
    (b) Fermenting the inoculated solution at temperatures conductive to growth of said organism, 7. In a method for producing D-arabitol, the steps comprising:
  (a) Inoculating an aqueous solution containing a carbohydrate source with at least one organism selected from the group consisting of *Sclerotium coffeicolum* Stahel (Pillsbury Culture Code No. 7, American Type Culture Collection No. 15208); *Sclerotium delphinii* Stevens (Pillsbury Culture Code No. 8, American Type Culture Collection No. 15196); *Schlerotium delphinii* Gilman (Pillsbury Culture Code No. 23, American Type Culture Collection No. 15197); *Sclerotium rolfsii* Gilman (Pillsbury Culture Code No. 24, American Type Culture Collection No. 15195); *Sclerotium rolfsii* Barnett (Pillsbury Culture Code No. 27, American Type Culture Collection No. 15201); *Sclerotium rolfsii* Barnett (Pillsbury Culture Code No. 31, American Type Culture Collection No. 15206); *Sclerotium rolfsii* Barnett (Pillsbury Culture Code No. 32, American Type Culture Collection No. 15203); *Sclerotium delphinii* Welch/White (Pillsbury Culture Code No. 46, American Type Culture collection No. 15200); *Corticium rolfsii* (Sacc) Curzi (Pillsbury Culture Code No. 50, American Type Culture Collection No. 15212); *Corticium rolfsii* Curzi/Ficus (Pillsbury Culture Code No. 57, American Type Culture Collection No. 15209); *Sclertoium rolfsii* QM (Pillsbury Culture Code No. 78, American Type Culture Collection No. 15202); *Sclerotium rolfsii* QM (Pillsbury Culture Code No. 79, American Type Culture Collection No. 15204); *Sclerotium delphinii* Welch/Mix (Pillsbury Culture Code No. 9, American Type Culture Collection No. 15199); *Sclerotium delphinii* Stevens I (Pillsbury Culture Code No. 19, American Type Culture Collection No. 15194); *Sclerotium rolfsii* Barnett (Pillsbury Culture Code No. 26, American Type Culture Collection No. 15205); *Stromatinia narcissi* Groves (Pillsbury Culture Code No. 44, American Type Culture Collection No. 15213); *Sclerotinia gladoli* Drayton/Massey (Pillsbury Culture Code No. 45, American Type Culture Collection No. 15207); *Corticium rolfsii* (Sacc) Curzi (Pillsbury Culture Code No. 51, American Type Culture Collection No. 15210); *Corticium rolfsii* Curzi/Balducci (Pillsbury Culture Code No. 52, American Type Culture Collection No. 15211); *Sclerotium delphinii* Jerseveld/Welch (Pillsbury Culture Code No. 53, American Type Culture Collection No. 15198); fermenting the inoculated solution at temperatures conducive to growth of said organism, diluting the filtrate with water, removing cells from the solution, concentrating the solution, admixing with a substantially equal volume of a reagent adapted to precipitate polysacchardie gums, removing the precipitate formed by the admixture of said reagent, neutralizing the solution and removing precipitates thus formed, admixing sufficient water-miscible organic solvent to precipitate additional carbohydrates, removing the solvent, passing the solution through a finely divided adsorbant, removing glucose from the solution and thereafter isolating D-arabitol from the solution.

References Cited by the Examiner

Solberg, Y. N.: Acta Chem. Scand. 9, 1234 (1955), as abstracted in Chemical Abstracts 50.

Stark, J. B., et al.: J.A.C.S. 72, 1819–20 (Apr. 1950).

Nishikawa, H.: Agricultural and Biological Chemical Society of Japan 26, 696–698 (1962).

A. LOUIS MONACELL, *Primary Examiner.*

L. M. SHAPIRO, *Assistant Examiner.*